United States Patent
Cho et al.

(10) Patent No.: US 10,113,685 B2
(45) Date of Patent: Oct. 30, 2018

(54) DISPLAY DEVICE

(71) Applicant: LG Display Co., Ltd., Seoul (KR)

(72) Inventors: SeokHyo Cho, Gyeonggi-do (KR); Yongjoon Jeon, Seoul (KR)

(73) Assignee: LG Display Co., Ltd., Seoul (KR)

( * ) Notice: Subject to any disclaimer, the term of this patent is extended or adjusted under 35 U.S.C. 154(b) by 45 days.

(21) Appl. No.: 15/155,248

(22) Filed: May 16, 2016

(65) Prior Publication Data

US 2016/0353594 A1    Dec. 1, 2016

(30) Foreign Application Priority Data

May 27, 2015 (KR) .......................... 10-2015-0073518

(51) Int. Cl.
*F16M 11/22* (2006.01)
*F16M 11/08* (2006.01)

(52) U.S. Cl.
CPC ............. *F16M 11/22* (2013.01); *F16M 11/08* (2013.01); *F16M 2200/08* (2013.01)

(58) Field of Classification Search
CPC ........ F16M 11/02; F16M 11/22; F16M 11/08; F16M 2200/08
See application file for complete search history.

(56) References Cited

U.S. PATENT DOCUMENTS

| | | | | |
|---|---|---|---|---|
| 5,833,337 A | * | 11/1998 | Kofstad | H05K 7/1421 211/175 |
| 7,316,378 B1 | * | 1/2008 | Curran | A47F 5/0068 248/298.1 |
| 9,608,231 B2 | * | 3/2017 | Lee | H01L 51/5237 |
| 9,711,752 B2 | * | 7/2017 | Lee | H01L 51/5237 |
| 2009/0050760 A1 | * | 2/2009 | Duff | F16M 13/02 248/231.91 |
| 2011/0249425 A1 | * | 10/2011 | Aurongzeb | F21V 14/02 362/102 |

(Continued)

FOREIGN PATENT DOCUMENTS

| | | |
|---|---|---|
| CN | 1819416 A | 8/2006 |
| CN | 102812291 A | 12/2012 |

(Continued)

OTHER PUBLICATIONS

Office Action dated May 31, 2018, from the Chinese Patent Office issued in related Chinese Patent Application No. 201610349977.3.

(Continued)

*Primary Examiner* — David M Sinclair
*Assistant Examiner* — Theron S Milliser
(74) *Attorney, Agent, or Firm* — Morgan, Lewis & Bockius LLP

(57) ABSTRACT

A display device includes a back cover and a bending member. The bending member includes a fixing member coupled to the back surface of the back cover to change the curvatures of the display panel and the back cover, a pair of holder members coupled to the back cover to be spaced apart from the left and right sides of the fixing member, a pair of support members respectively hinge-coupled to the pair of holder members such that one ends thereof respectively support left and right sides of the back cover, and a sliding member slidably coupled to the fixing member to rotate the support member while supporting the other end of the support member.

10 Claims, 10 Drawing Sheets

(56) References Cited

U.S. PATENT DOCUMENTS

| | | | | |
|---|---|---|---|---|
| 2012/0175474 A1* | 7/2012 | Barnard | ............... | F16M 11/041 248/122.1 |
| 2013/0037228 A1* | 2/2013 | Verschoor | ............. | G06F 1/1652 160/377 |
| 2013/0114193 A1* | 5/2013 | Joo | ........................ | F16M 11/08 361/679.01 |
| 2013/0155655 A1* | 6/2013 | Lee | ........................ | H05K 5/03 362/97.1 |
| 2013/0207946 A1* | 8/2013 | Kim | ..................... | G09G 3/3225 345/204 |
| 2014/0226266 A1 | 8/2014 | Kang et al. | | |
| 2014/0354519 A1* | 12/2014 | Lee | ........................ | G09F 9/301 345/76 |
| 2015/0009635 A1* | 1/2015 | Kang | ..................... | G09F 9/301 361/749 |
| 2015/0043136 A1* | 2/2015 | Kim | ................. | G02F 1/133305 361/679.01 |
| 2015/0145837 A1* | 5/2015 | Park | ........................ | H04N 5/64 345/184 |
| 2015/0201723 A1* | 7/2015 | Rayner | ................. | G06F 1/1601 224/191 |
| 2015/0223358 A1* | 8/2015 | Nam | ...................... | H05K 1/028 361/749 |
| 2015/0271931 A1* | 9/2015 | Park | ........................ | H04N 5/64 361/807 |
| 2015/0296641 A1* | 10/2015 | Song | .................... | H05K 5/0217 361/679.01 |

FOREIGN PATENT DOCUMENTS

| | | |
|---|---|---|
| CN | 103985314 A | 8/2014 |
| CN | 104008707 A | 8/2014 |
| JP | 2006-023676 A | 1/2006 |

OTHER PUBLICATIONS

Zhang, Shanzhong, Precision Instrument Structure Design Manual, China Machine Press, Apr. 30, 2009, pp. 841-843.

Shen, Bingbing, Practical Mechanism Atlas, 2nd Ed., China Machine Press, Sep. 30, 2013, pp. 142-146.

* cited by examiner

DISPLAY DEVICE

CROSS REFERENCE TO RELATED APPLICATION

This application claims priority from Korean Patent Application Number 10-2015-0073518 filed on May 27, 2015, which is hereby incorporated by reference for all purposes as if fully set forth herein.

BACKGROUND

Field

The present disclosure relates to a display device and, more particularly, to a display device allowing a user to change the curvature of a display panel according to his or her choice, so that the user can be increasingly immersed in watching a screen.

Description of Related Art

Generally, as for flat panel-type display devices, liquid crystal display devices, plasma display devices, organic light-emitting diode (OLED) display devices, and the like have been actively researched. Among them, however, the liquid crystal display (LCD) devices and OLED display devices have received much of the limelight as they have advantages of adaptability to mass production, easy implementation of a drive unit, implementation of high definition image, and so forth.

Recently, research and development of flat panel-type display devices are needed in terms of design aspects of products holding greater appeal to consumers, as well as technical aspects of products.

Therefore, there is an increased demand for display devices having such curvature, i.e. curved display devices.

Currently developed curved display devices are configured such that a panel and a back cover are curved at a certain curvature, and a fastening unit having the same curvature as the back cover is coupled to a back surface of the back cover.

However, such curved display devices have problems in that they have a predefined curvature and thus a user cannot change the curvature as he or she desires, so that a user can only access contents displayed on a screen at a fixed display angle.

In particular, since there is a recent trend toward an increase in the size of a panel, so that the curvature of the panel increases depending on the size of the panel, it is difficult to develop innovative display devices having a variable curvature for which consumers demand.

BRIEF SUMMARY

Accordingly, the present invention is directed to a display device that substantially obviates one or more of the problems due to limitations and disadvantages of the related art.

An object of the present invention is to provide a display device that allows a user to arbitrarily change the curvature thereof such that the display device is converted into the shape of a flat display or a curved display.

Another object of the present invention is to provide a large scale display device that allows a user to easily change the curvature thereof without regard to the size thereof, thereby satisfying a variety of user needs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a display device comprises a back cover onto which a display panel is seated and a bending member. The bending member includes a fixing member coupled to the back surface of the back cover to change the curvatures of the display panel and the back cover, a pair of holder members coupled to the back cover to be spaced apart from the left and right sides of the fixing member, a pair of support members respectively hinge-coupled to the pair of holder members such that one ends thereof respectively support left and right sides of the back cover, and a sliding member slidably coupled to the fixing member to rotate the support member while supporting the other end of the support member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
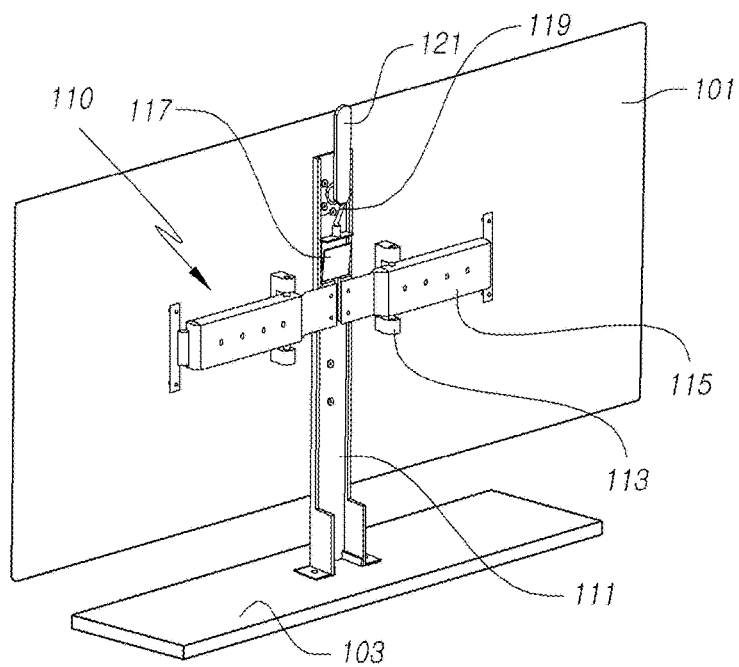
FIG. 1 is a perspective view illustrating a display device according to an exemplary embodiment.

Reference will now be made in detail to embodiments of the present disclosure, examples of which are illustrated in the accompanying drawings. Throughout this document, reference should be made to the drawings, in which the same reference numerals and signs will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are only used to distinguish one element from another element. The substance, sequence, order or number of these elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

Figure 2:
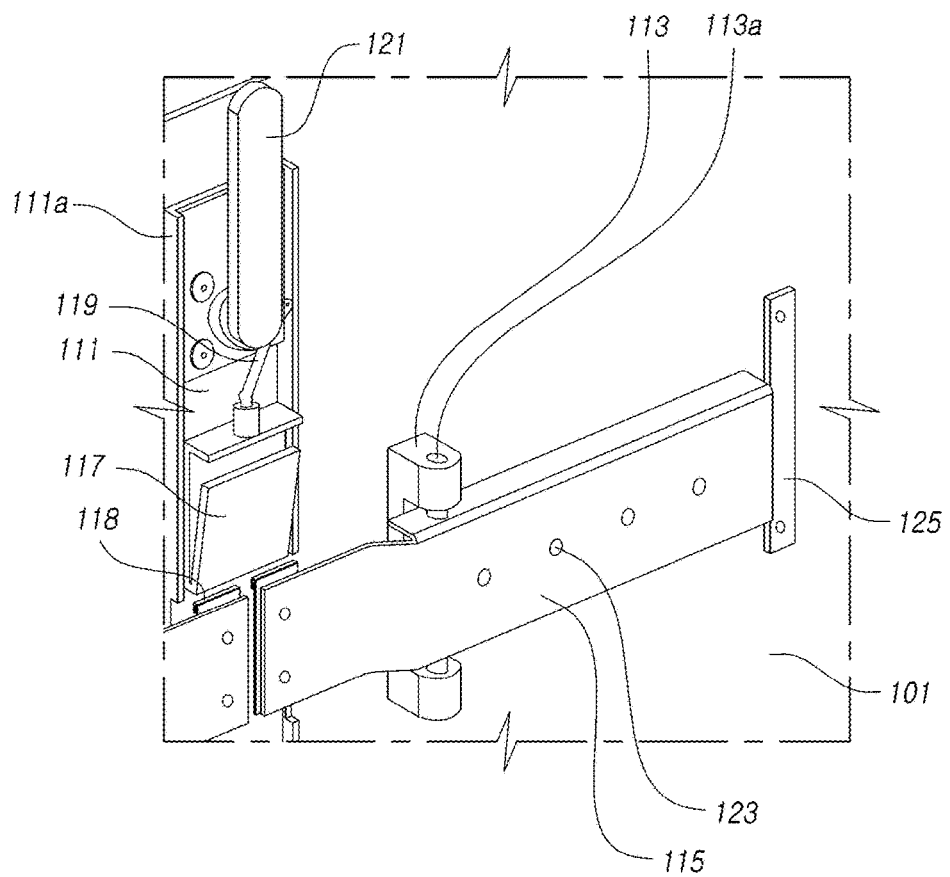
FIG. 2 is a partially enlarged perspective view of FIG. 1.
Figure 3:
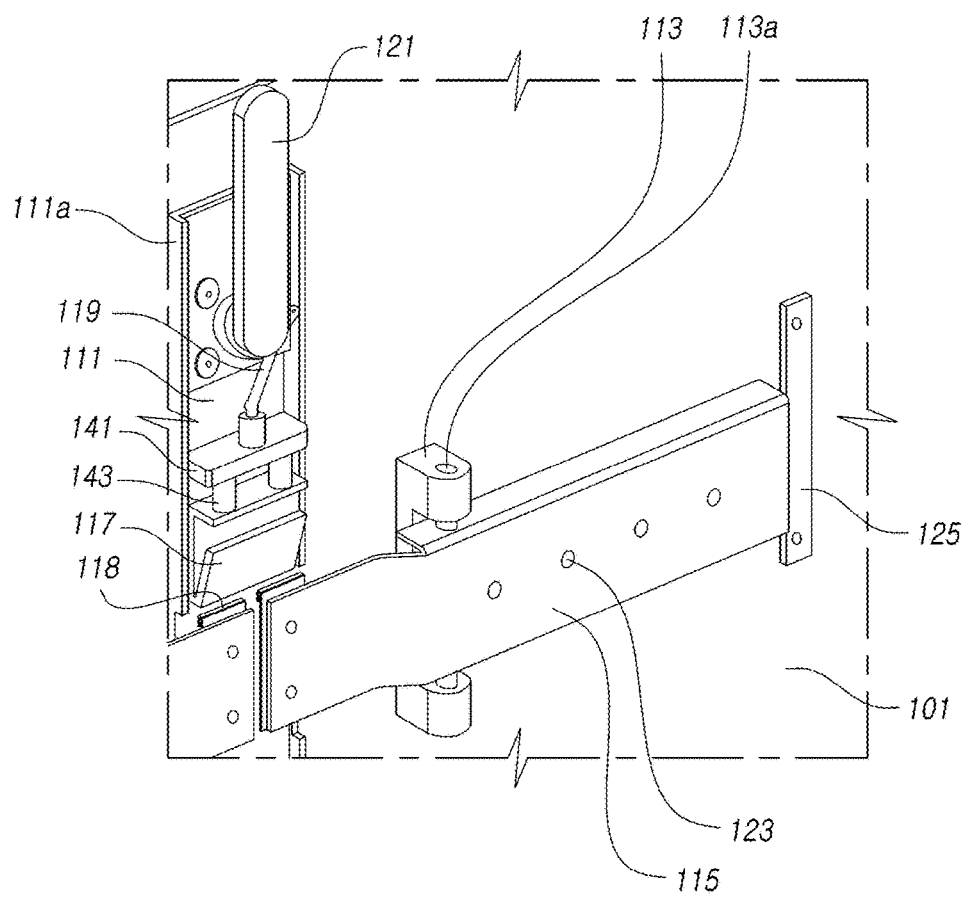
FIG. 3 is an enlarged perspective view illustrating a modified embodiment of FIG. 2.
Figure 4:
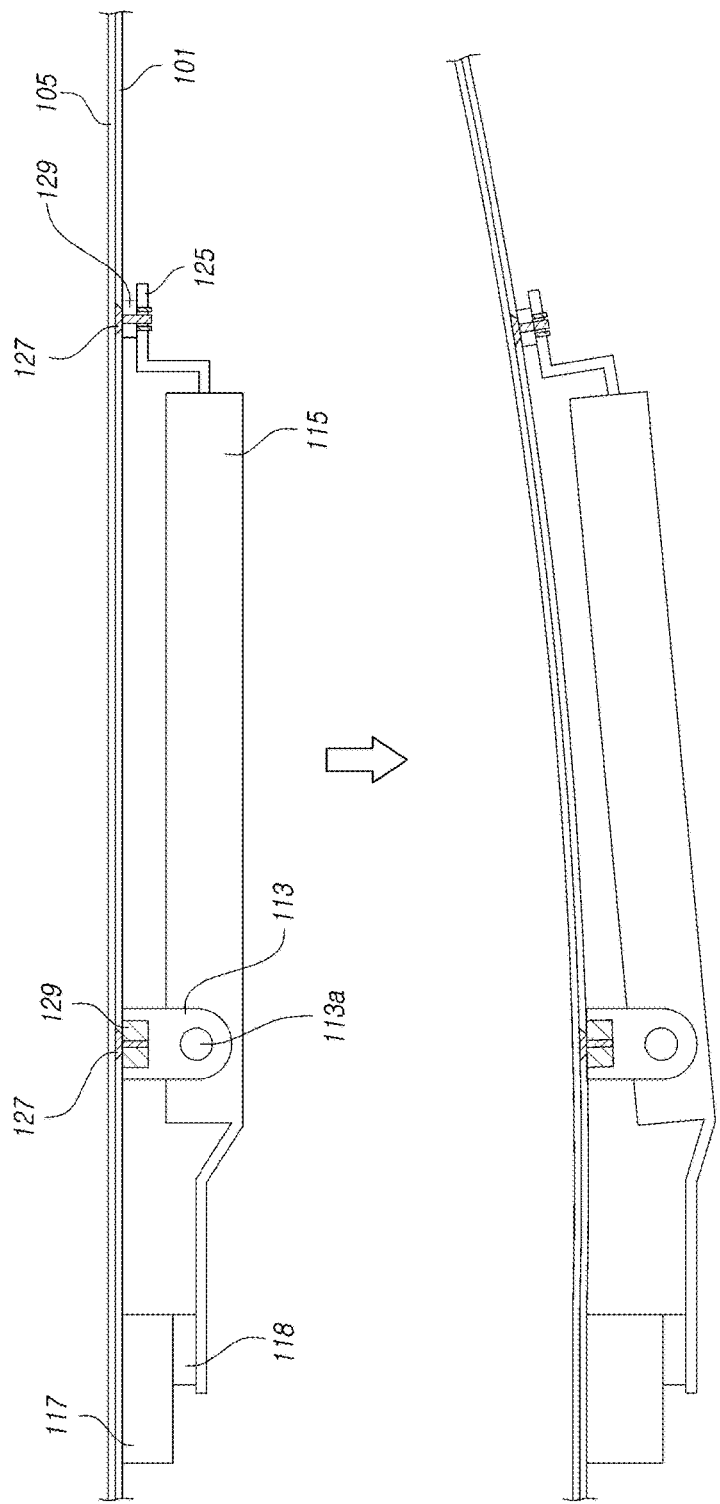
FIG. 4 is a plan view illustrating a display device according to an exemplary embodiment.
Figure 5:
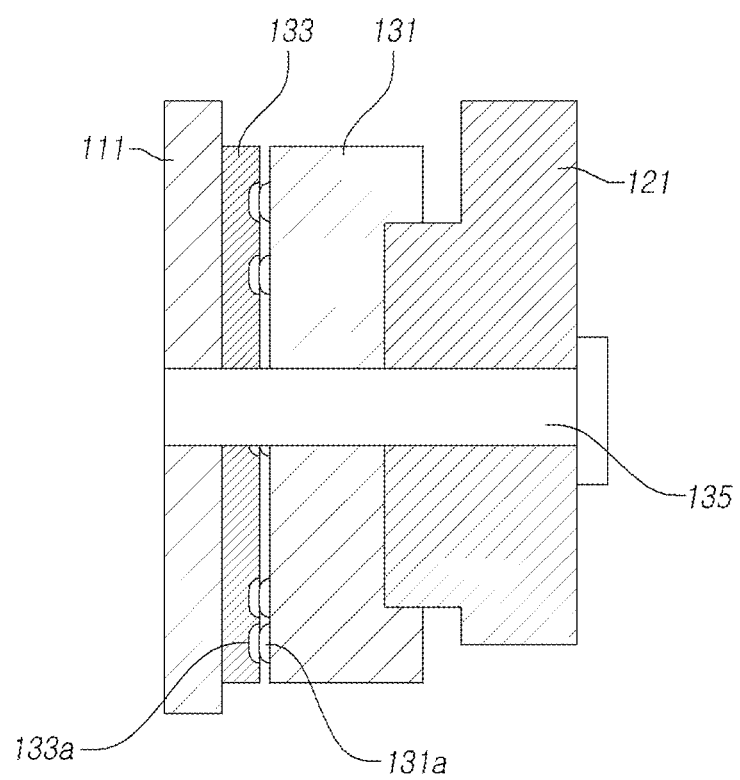
FIG. 5 is a cross-sectional view illustrating a portion of a display device according to an exemplary embodiment.
Figure 6:
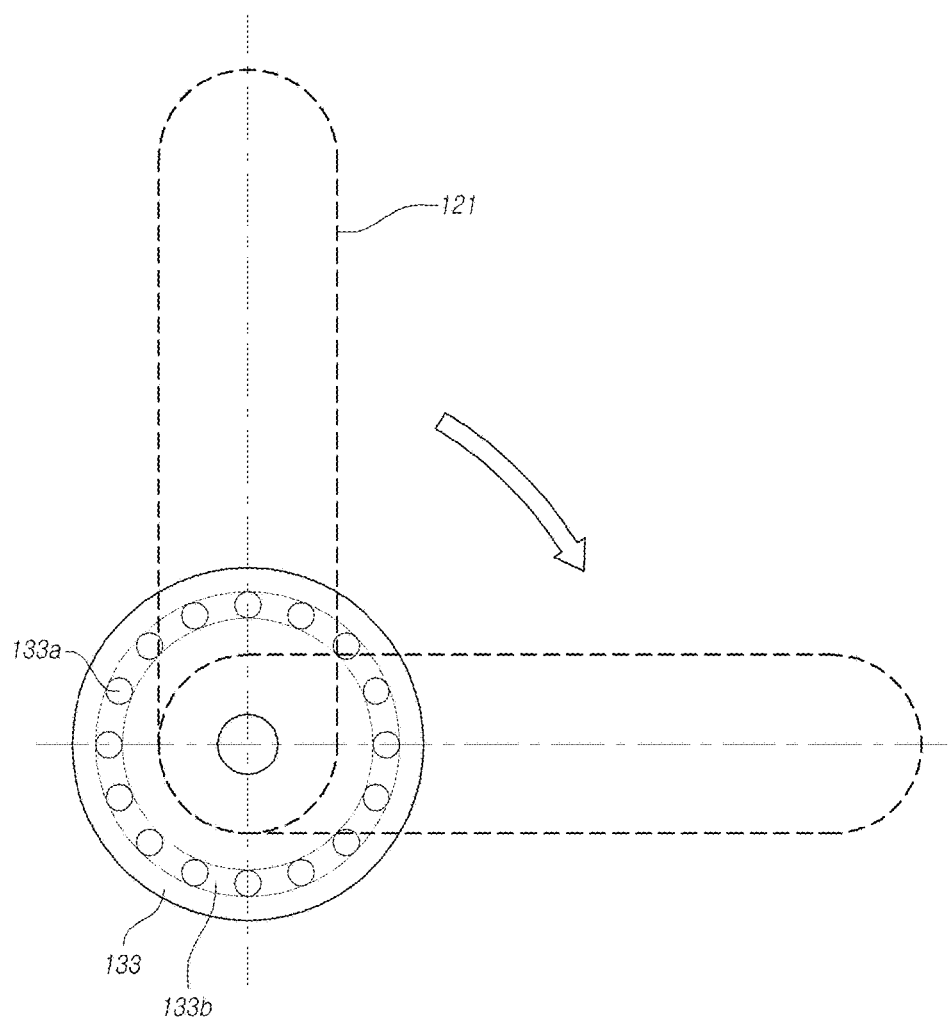
FIG. 6 is a front view illustrating a portion of a display device according to an exemplary embodiment.
Figure 7:
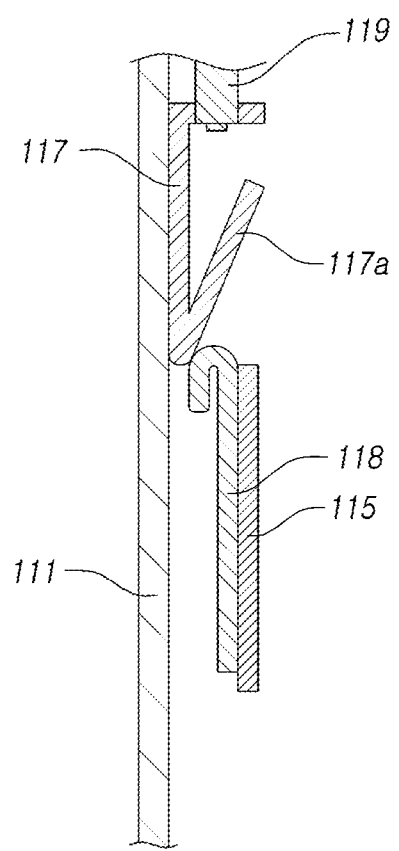
FIGS. 7 and 8 are cross-sectional views illustrating a portion of a display device according to an exemplary embodiment.
Figure 8:
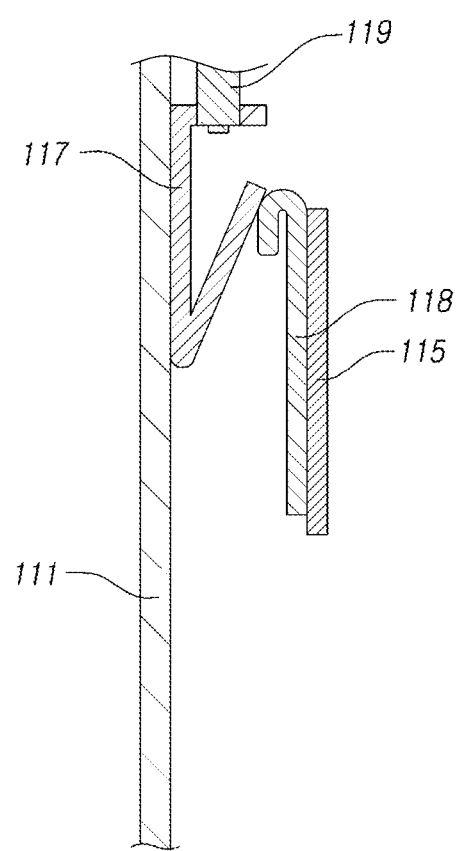
Figure 9:
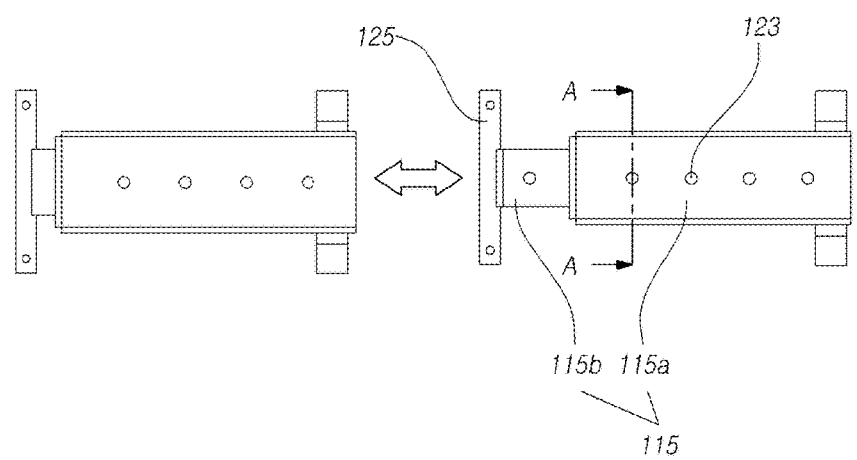
FIG. 9 is a front view illustrating a portion of a display device according to an exemplary embodiment.
Figure 10:
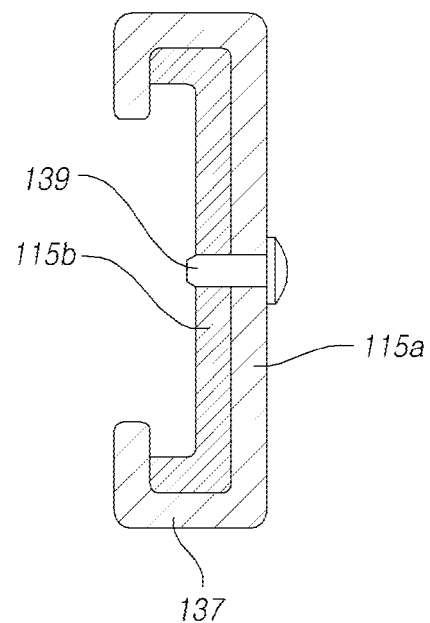
FIG. 10 is a cross-sectional view taken along a line A-A of FIG. 9.

FIG. 1 is a perspective view illustrating a display device according to an exemplary embodiment, FIG. 2 is a partially enlarged perspective view of FIG. 1, FIG. 3 is an enlarged perspective view illustrating a modified embodiment of FIG. 2, FIG. 4 is a plan view illustrating a display device according to an exemplary embodiment, FIG. 5 is a cross-sectional view illustrating a portion of a display device according to an exemplary embodiment, FIG. 6 is a front view illustrating a portion of a display device according to an exemplary embodiment, FIGS. 7 and 8 are cross-sectional views illustrating a portion of a display device according to an exemplary embodiment, FIG. 9 is a front view illustrating a portion of a display device according to an exemplary embodiment, and FIG. 10 is a cross-sectional view taken along a line A-A of FIG. 9.

As illustrated in the drawings, the display device according to exemplary embodiments of the present disclosure includes a back cover 101 onto which a display panel 105 is seated, and a bending member 110 coupled to the back surface of the back cover 101 to change the curvature of the display panel 105.

The bending member 110 includes a fixing member 111 coupled to the back surface of the back cover 101 to change the curvature of the display panel 105 and the curvature of the back cover 101, a pair of holder members 113 respectively disposed on left and right sides of the fixing member 111 and coupled to the back cover 101, a pair of support members 115 respectively hinge-coupled to the holder members 113 such that one ends thereof support left and right sides of the back cover 101, and a sliding member 117 slidably coupled to the fixing member 111 to rotate the support members 115 while supporting the other ends of the support members 115.

The fixing member 111 coupled to a support stage 103 is detachably coupled to the back surface of the back cover 101 by means of a fastening member. The fixing member extends along the vertical length and is coupled to a horizontally symmetrical central portion of the back cover 101, and has bent portions 111a on opposite sides thereof such that the sliding member 117 is able to be vertically slid along the bent portions.

The holder members 113 are respectively disposed on left and right sides of the fixing member 111 in such a manner as to be spaced apart from the fixing member 111 and are coupled to the back cover 101. The holder members are hinge-coupled to the support members 115 extending lengthily toward left and right sides.

The back surface of the holder member 113 is closely attached to the back cover 101. The holder member 113 has large-diameter protrusions on the upper and lower ends thereof. A hinge pin 113a passes through and is coupled to the protrusions and a hinge hole of the support member 115. In some cases, a clinch nut 129 (also referred to as a PEM nut or an insertion nut) may be fixedly fitted into the back surface of the holder member 113 to be coupled to the back cover 101 by means of a fastening member 127.

The support members 115 are hinge-coupled to the holder members 113 such that during the sliding motion of the sliding member 117, the support members are rotated on the left and right sides about the holder members 113 and one ends of the support members 115 support the back cover 101 as well, thereby changing the curvature of the back cover 101 and the panel 105.

Further, as illustrated in FIG. 4, opposite ends of the sliding member 117 are vertically slid along the opposite bent portions 111a of the fixing member 111 and the other ends of the support members 115 while being supported by the opposite bent portions, and thus cause the support members 115 to be rotated about the holder members 113, so that one ends of the support members 115 support the back cover 101 and thus the curvature of the back cover 101 and the curvature of the panel 105 are changed.

That is, when the sliding member 117 slides downwards, the other ends of the support members 115 are lifted in the direction facing away from the fixing member 111 by the sliding member 117, and one ends of the support members are moved in the opposite direction about the holder members, thereby bending the back cover and changing the curvature thereof.

Thus, as illustrated in FIGS. 7 and 8, when the sliding member 117 is slid downwards (FIG. 8) from an initial state (FIG. 7), according to the principle of a lever in which the other ends of the support members 115 become loading points and the holder members 113 become support points, the support members 115 are rotated about the holder members 113 and one ends of the support members 115 support and bend the back covers 101, thereby changing the curvature thereof.

Here, the amount of force for rotating the support members 115 and a distance by which the other ends of the support members 115 move towards the front back cover change according to the positions of the holder members 113. As the ratio of the distance from predetermined ends of the support members 115 supported by the sliding member 117 to the holder members 113 to the distance from the holder members 113 to the other ends of the support members 115 decreases, i.e. the holder members 113 are positioned farther away from the center of the fixing member 111, the amount of force for moving the sliding member 117 downwards decreases. However, the distance by the other ends of the support members 115 move forwards decreases, thereby reducing the amount of changes in the curvature of the panel 105 and the curvature of the back cover 101.

On the contrary, as the ratio of the distance from predetermined ends of the support members 115 to the holder members 113 to the distance from the holder members 113 to the other ends of the support members 115 increases, i.e. the holder members 113 are positioned closer to the center of the fixing member 111, the amount of force for moving the sliding member 117 downwards increases. However, the distance by which the other ends of the support members 115 move forwards increases, thereby increasing the amount of changes in the curvature of the panel 105 and the curvature of the back cover 101.

Thus, in consideration of both variations in the curvature of the panel 105 and the back cover 101 and user's convenience, the ratio of the distance from predetermined ends of the support members 115 to the holder members 113 to the distance from the holder members 113 to the other ends of the support members 115 is set to the range from 1:4 to 1:6.

In the meantime, although the user may slide the sliding member 117 by manually pushing the sliding member 117 between the other ends of the support members 115 and the fixing member 111, it is possible to slide the sliding member using a lever 121 and a link member 119 for ease of operation, as will be described later.

That is, the bending member 110 may include a lever 121 rotating while being coupled to the fixing member 111, and a link member 119 connected to the lever 121 and the sliding member 117 in order to facilitate a vertical sliding of the sliding member 117.

Here, the lever 121 has a first stopper 131 on the back surface thereof. The first stopper 131 has a protrusion 131a extending toward the fixing member 111. The fixing member 111 has a second stopper 133 on the front surface thereof. The second stopper 133 has a groove 133a into which the protrusion 131a of the first stopper 131 is fitted. With this configuration, the rotation position of the lever 121 can be fixed.

The lever 121 and the first stopper 131, and the second stopper 133 and the fixing member 111 are coupled together by a rotary shaft 135 to facilitate the vertical sliding of the sliding member 117. The first stopper 131 may be integrally formed with the lever 121, and the second stopper 133 may be integrally formed with the fixing member 111. Here, the first and second stoppers 131 and 133 are formed from an elastically compressible plastic resin.

The first stopper 131 has one or more protrusion 131a spaced apart in the circumferential direction about the rotary shaft 135, and the second stopper 133 has one or more grooves 133a at positions corresponding to those of the protrusions 131a.

Thus, when the lever 121 is manipulated, the protrusions 131a are coupled into the grooves 133a by predetermined angles of rotary, thereby providing lever-stopping actions at regular angle intervals.

In the case of two or more grooves 133a, a guide rail 133b is provided between the grooves 133a to allow the protrusion 131a to be rotated while being supported by the guide rail during the rotation of the lever 121. Thus, when the lever 121 is manipulated, the protrusions 131a are respectively fitted into and coupled to the grooves 133a at regular angles of rotation, and the protrusions are moved along and supported by the guide rail 133b between the grooves 133a.

Since the depth of the groove 133a is smaller than that of the guide rail 133b, when the protrusion 131a is moved to an adjoining groove 133a, the amount of force for manipulating the lever 121 is reduced.

That is, in the case where there is no guide rail 133b, when the protrusion 131a is moved to an adjoining groove 133a during manipulation of the lever 121, the protrusion should be escaped from the former groove 133a and be moved onto a surface of the second stopper 133, the amount of elastic compression of the first and second stoppers 131 and 133 increases and thus the manipulation force of the lever by a user increases. In contrast, when the protrusion 131a is moved to an adjoining groove 133a while passing along the guide rail 133b lower than the surface of the second stopper 133, the amount of the first and second stopper 131 and 133 is correspondingly reduced and thus the manipulation force of the lever by a user is advantageously reduced.

The distance between the grooves 133a, i.e. the angle between the grooves 133a at which the lever 121 rotates about the rotary shaft, may be previously set and determined to conform to a change in the curvature of the panel 105 and the back cover 101.

Specifically, this value (i.e. the distance or angle) may be set such that changes in the curvatures depending on the angle of manipulation of the lever 121 in response to the curvatures of the panel 105 and the back cover 101 being changed by a user can be sensed. For example, when the angle of manipulation is zero (0) degree at which the lever 121 is not manipulated, the curvature is infinite since the panel 105 is flat. When the angle of manipulation is 30 degrees, the curvature is 6000 mm. When the angle of manipulation is 60 degrees, the curvature is 4000 mm. When the maximum angle of manipulation is 90 degrees, the maximum curvature is 2000 mm. Such values may be marked on the lever 121, the back cover 101, or the like in order to enhance the convenience of the user.

The sliding member 117 is formed as a wedge-shaped member having a front inclined surface 117a, the height of which increases toward the upper portion thereof, i.e. in the direction facing away from the support members 115. During the manipulation of the lever 121, as the sliding distance of the sliding member 117 increases, the support members are spaced apart from the fixing member 111 by greater distances, i.e. the rotation of the support members increases, thereby increasing the curvature of the panel 105 and the back cover 101.

The sliding member 117 is vertically slid during the manipulation of the lever 121 in the position of being coupled to the link member 119. A connection member 141 may be connected to the upper end of the sliding member in order to uniformly transfer a load onto the upper end that is compressed by the link member 119.

That is, the connection member 141 is connected to the upper end of the sliding member 117 at opposite symmetrical positions of the upper end by means of fastening members 143, and the center portion of the connection member 141 is coupled to the link member 119, so that the connection member can be vertically slid along with the sliding member 117.

An insertion member 118 by which the sliding member 117 is supported may be coupled to the other ends of the support members 115 supported by the sliding member 117. The upper end of the insertion member 118 is rounded such that the insertion member 118 can be closely attached to and supported by the sliding member 117 without resistance.

The support member 115 may be configured such that first and second support sections 115a and 115b partially overlap in the horizontal direction of the back cover 101, i.e. the longitudinal direction of the support member, in order to change the length of the support member in the horizontal direction.

That is, the support member 115 may include the first support section 115a hinge-coupled to the holder member 113, and the second support section 115b supported by the first support section 115a and slidable in the horizontal direction.

The first support section 115a has bent portions 137 on the upper and lower ends thereof to allow the second support section 115b to slide along the horizontal direction of the back cover 101 in the position in which the upper and lower ends of the second support section are supported by and coupled in the bent portions 137, so that the length of the support member can be adjusted according to the size of the panel and the back cover 101.

Thus, it is possible to adjust the length of the support member 115 depending on the sizes of large scale panels, thereby facilitating the changing of the curvature irrespective of the sizes of large scale panels that are fabricated with a variety of sizes.

In addition, the first and second support sections 115a and 115b respectively have through-holes 123 at regular intervals, so that the sliding distance of the second support section 115*b* can be adjusted step by step by the intervals between the through-holes 123.

In some cases, a fastening member 139 may be coupled through the through-holes 123 of the first and second support sections 115*a* and 115*b*, so that a further motion of the second support section 115*b* after being slid can be prevented.

In addition, the support member 115 may have a cover-fitting portion 125 on one end thereof, the cover-fitting portion 125 vertically extending to support the back cover 101. This enlarges the portion supporting the back cover, thereby facilitating the changing of the curvature. When the support member 115 consists of the first and second support sections 115*a* and 115*b*, the cover-fitting portion may be provided on one end of the second support section 115*b*.

The cover-fitting portion may be attached to the back cover 101 by means of a suction plate (or a press-fitting plate) provided on the cover-fitting portion or otherwise a clinch nut 129 (also referred to as a PEM nut or an insertion nut) along with a fastening member 127. When the cover-fitting portion is attached to the back cover 101 using the suction plate or the clinch nut along with the fastening member 127, elastic restoration of the back cover 101 is facilitated during restoration from a curved panel to a flat panel.

The present disclosure is applicable to all of display devices irrespective of types of display panels, such as an LCD panel or an OLED panel.

Although only the OLED panel is illustrated in the drawings, the present disclosure is also applicable to LCD panels. It should be understood that relevant configurations, such as an optical source module, a light guide plate, a light control member, a light reflector, and the like, are commonly known in the art to which the present disclosure pertains, so detailed descriptions thereof will be omitted.

According to the present disclosure as set forth above, it is possible to provide the display device allowing a user to arbitrarily change the curvature of a panel such that the display device is converted into the shape of a flat display or a curved display.

In addition, according to the present disclosure, a user can easily change the curvature of a large scale display device allowing without regard to the size thereof, such that the display device can satisfy a variety of user needs.

It will be apparent to those skilled in the art that various modifications and variations can be made in the display device of the present invention without departing from the spirit or scope of the invention. Thus, it is intended that the present invention cover the modifications and variations of this invention provided they come within the scope of the appended claims and their equivalents.

What is claimed is:

1. A display device, comprising:
    a display panel;
    a back cover onto which the display panel is seated; and
    a bending member, the bending member comprising:
        a fixing member coupled to a back surface of the back cover to change curvatures of the display panel and the back cover;
        a pair of holder members coupled to the back cover and spaced apart from the left and right sides of the fixing member;
        a pair of support members respectively hinge-coupled to the pair of holder members such that one end of each of the pair of support members respectively supports left and right sides of the back cover; and
        a sliding member slidably coupled to the fixing member to rotate the support members,
    wherein the sliding member comprises a front inclined surface, the front inclined surface supporting the support members while sliding vertically,
    wherein the front inclined surface of the sliding member is located on a top surface of the support member at a maximum vertical sliding position, and
    wherein the front inclined surface of the sliding member is located directly between the support members and the fixing member at a vertical sliding position below the maximum vertical sliding position.

2. The display device of claim 1, wherein the bending member further comprises:
    a lever rotatably coupled to the fixing member; and
    a link member connected to the lever and the sliding member, and is configured to vertically slide the sliding member along with rotation of the lever.

3. The display device of claim 2, wherein:
    the lever comprises a first stopper, the first stopper comprising a protrusion extending toward the fixing member; and
    the fixing member comprises a second stopper, the second stopper comprising a groove into which the protrusion is inserted, such that a position of rotation of the lever is able to be fixed.

4. The display device of claim 3, wherein:
    the lever and the first stopper are coupled to each other by a rotary shaft; and
    the second stopper and the fixing member are coupled to each other by the rotary shaft.

5. The display device of claim 4, wherein the first stopper comprises one or more protrusion spaced apart in a circumferential direction about the rotary shaft.

6. The display device of claim 5, wherein:
    the second stopper comprises two or more grooves; and
    a guide rail is between the grooves and is configured to allow the protrusions to be rotated along the guide rail while being supported by the guide rail.

7. The display device of claim 1, wherein the sliding member is a wedge-shaped member comprising the front inclined surface, a height of the front inclined surface increasing toward an upper portion thereof that faces away from the support members.

8. The display device of claim 1, wherein the support member comprises:
    a first support section hinge-coupled to the holder member; and
    a second support section supported by the first support section and configured to slide in left and right sides, such that a length of the support member is adjustable in left and right sides.

9. The display device of claim 8, wherein:
    the first support section has bent portions on upper end lower ends thereof; and
    upper and lower ends of the second support section are coupled to and supported by the bent portions.

10. The display device of claim 1, wherein the support member comprises a cover-fitting portion on one end thereof, the cover-fitting portion vertically extending to increase its length and to support the back cover.

* * * * *